(12) United States Patent
Kementsietsidis et al.

(10) Patent No.: US 11,983,173 B2
(45) Date of Patent: May 14, 2024

(54) SYSTEMS AND METHODS FOR GENERATION AND APPLICATION OF SCHEMA-AGNOSTIC QUERY TEMPLATES

(71) Applicants: Google LLC, Mountain View, CA (US); Anastasios Kementsietsidis, San Mateo, CA (US); Jay Yogeshbhai Pandya, Fremont, CA (US); Tingting Tang, East Palo Alto, CA (US); Laurren Kanner, Mountain View, CA (US)

(72) Inventors: Anastasios Kementsietsidis, San Mateo, CA (US); Jay Yogeshbhai Pandya, Fremont, CA (US); Tingting Tang, East Palo Alto, CA (US); Laurren Kanner, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/786,338

(22) PCT Filed: Dec. 16, 2019

(86) PCT No.: PCT/US2019/066561
§ 371 (c)(1),
(2) Date: Jun. 16, 2022

(87) PCT Pub. No.: WO2021/126154
PCT Pub. Date: Jun. 24, 2021

(65) Prior Publication Data
US 2023/0037412 A1    Feb. 9, 2023

(51) Int. Cl.
*G06F 16/242* (2019.01)
*G06F 16/21* (2019.01)
*G06F 16/2455* (2019.01)

(52) U.S. Cl.
CPC ........ *G06F 16/242* (2019.01); *G06F 16/212* (2019.01); *G06F 16/2455* (2019.01)

(58) Field of Classification Search
CPC ... G06F 16/242; G06F 16/2455; G06F 16/212
(Continued)

(56) References Cited

U.S. PATENT DOCUMENTS 5,909,570 A * 6/1999 Webber .................. G06F 16/258
703/13
6,643,652 B2 * 11/2003 Helgeson ............... G06F 16/258
(Continued)

OTHER PUBLICATIONS

International Preliminary Report on Patentability for Application No. PCT/US2019/066561, dated Jun. 30, 2022, 8 pages.
(Continued)

*Primary Examiner* — Hanh B Thai
(74) *Attorney, Agent, or Firm* — DORITY & MANNING P.A.

(57) ABSTRACT

The present disclosure provides systems and methods that generate query templates that are expressed in a generic schema-agnostic language. The query templates can be generated "from scratch" or can be automatically generated from existing queries, a process which may be referred to as "templatizing" the existing queries. As one example, generation of query templates can be performed through an iterative process that iteratively generates candidate templates over time to optimize a coverage over a set of existing queries. After generation of the schema-agnostic query templates, the systems and methods described herein can automatically translate/map the templatized queries into "concrete," schema-specific queries that can be evaluated over specific customer schemas/datasets. In this manner, a query template for a given semantic query (e.g., "return the names of all employees"), is required to be written only once.

20 Claims, 5 Drawing Sheets

(58) Field of Classification Search
USPC .......................................................... 707/779
See application file for complete search history.

(56) References Cited

U.S. PATENT DOCUMENTS

| | | | |
|---|---|---|---|
| 7,333,981 B2 | 2/2008 | Dettinger | |
| 8,606,804 B2 * | 12/2013 | Merz | G06F 16/245 |
| | | | 707/779 |
| 9,152,735 B2 * | 10/2015 | Bohannon | G06F 16/84 |
| 10,310,723 B2 * | 6/2019 | Rathod | G06F 9/451 |
| 10,620,924 B2 * | 4/2020 | Stojanovic | G06F 8/433 |
| 11,113,294 B1 * | 9/2021 | Bourbie | G06F 16/24568 |
| 11,137,987 B2 * | 10/2021 | Namarvar | G06F 16/254 |
| 11,475,374 B2 * | 10/2022 | Polleri | G06F 16/285 |
| 11,573,971 B1 * | 2/2023 | Cannon | G06F 16/252 |
| 2003/0220917 A1 * | 11/2003 | Copperman | G06F 16/3322 |
| 2004/0205585 A1 * | 10/2004 | McConnell | G06F 40/143 |
| | | | 707/999.102 |
| 2005/0021548 A1 * | 1/2005 | Bohannon | G06F 16/84 |
| 2005/0240606 A1 | 10/2005 | Edelstein et al. | |
| 2006/0101005 A1 * | 5/2006 | Yang | G06F 16/9537 |
| 2009/0241015 A1 * | 9/2009 | Bender | G06F 16/48 |
| | | | 715/810 |
| 2012/0191716 A1 * | 7/2012 | Omoigui | H01L 27/14647 |
| | | | 707/E17.069 |
| 2012/0209869 A1 | 8/2012 | Kulack et al. | |
| 2018/0052870 A1 * | 2/2018 | Stojanovic | G06F 8/4452 |
| 2018/0052897 A1 * | 2/2018 | Namarvar | G06F 3/0482 |
| 2022/0066753 A1 * | 3/2022 | Namarvar | G06F 3/0428 |

OTHER PUBLICATIONS

International Search Report and Written Opinion for Application No. PCT/US2019/066561, dated May 15, 2020, 11 pages.

* cited by examiner

SYSTEMS AND METHODS FOR GENERATION AND APPLICATION OF SCHEMA-AGNOSTIC QUERY TEMPLATES

PRIORITY CLAIM

This application is based upon and claims the right of priority under 35 U.S.C. § 371 to International Application No. PCT/US2019/066561 having a filing date of Dec. 16, 2019, which is incorporated by reference herein.

FIELD

The present disclosure relates generally to database management. More particularly, the present disclosure relates to systems and methods for the generation of schema-agnostic query templates and their application to datasets with varying schemas.

BACKGROUND

A dataset is often structured according to a defined schema. A schema is a description or design of the structure or format of data records contained in a dataset. For example, a schema for a dataset can provide a description of attributes (e.g., represented in different columns) that can be populated for each data record and/or can provide descriptions of how different data records and/or data tables containing various data records may be interrelated or otherwise logically associated with one another. A schema may include all the implementation details necessary to store data records, such as the data types of the data records, constraints on the data records, and so on.

In many cases, and for any number of reasons such as separate development and/or collection of datasets, the schemas for various datasets differ (often significantly) from one another. Thus, a given dataset may be structured according to a specific schema that does not necessarily match the schema for other, potentially related datasets.

Currently, in view of this schema-specific nature of datasets, typical queries over datasets are expressed in specific query languages like SQL and are explicitly designed to account for the particular schemas of the repositories. Thus, to query a particular dataset, a query that accounts for the intricacies for the specific schema of the dataset to be queried must be developed. This process can require a significant amount of effort and expense, including development and testing of any number of intermediate, unsuccessful attempts. For larger entities such as companies that maintain hundreds or thousands of different datasets, writing a different schema-specific query for each different dataset represents an enormous challenge and source of inefficiency.

As one example, consider a query that returns the names of all employees. In Company A, the information for all employees might be stored in a table called 'Employees' and the name of each employee might be stored in a column called 'name'. Then, for Company A this query would be expressed as:

Q1: SELECT name
FROM Employees

But for Company B the employee name might be stored into two columns, called 'first_name' and 'last_name', in the table called 'Personnel'. Then, evaluating essentially the same query for Company B requires that we do a complete rewriting of the query and write something like:

Q2: SELECT first_name, last_name
FROM Personnel

What the above simple examples illustrate is that the same semantically equivalent query needs to be customized each time to the vocabulary of the specific schema against which the query is executing. This is actually the expectation that the SQL standard (in this example) enforces. Because schemas differ substantially across customers and databases, this task is almost always done manually, again representing a significant source of cost, effort, and inefficiency.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for application of schema-agnostic query templates to datasets. The method includes obtaining, by a computing system comprising one or more computing devices, a query template that includes one or more references to one or more taxonomy tags. Each of the one or more taxonomy tags is a schema-agnostic representation of a data group. The method includes accessing, by the computing system, a schema-taxonomy mapping associated with a dataset that is stored in a database and structured according to a schema, wherein the schema-taxonomy mapping defines a mapping between the one or more taxonomy tags and one or more components of the schema of the dataset. The method includes modifying, by the computing system, the query template based on the schema-taxonomy mapping to generate a schema-specific query. The method includes executing, by the computing system, the schema-specific query against the dataset stored in the database to generate a query result. The method includes providing, by the computing system, the query result as an output.

Another example aspect of the present disclosure is directed to a computing system that leverages schema-agnostic query templates. The computing system includes a database that stores a dataset; one or more processors; and one or more non-transitory computer-readable media that collectively store instructions that, when executed by the one or more processors, cause the computing system to perform operations. The operations include obtaining, by the computing system, a query template that includes one or more references to one or more taxonomy tags, each of the one or more taxonomy tags being a schema-agnostic representation of a data group. The operations include accessing, by the computing system, a schema-taxonomy mapping associated with the dataset and structured according to a schema, wherein the schema-taxonomy mapping defines a mapping between the one or more taxonomy tags and one or more components of the schema of the dataset. The operations include modifying, by the computing system, the query template based on the schema-taxonomy mapping to generate a schema-specific query. The operations include executing, by the computing system, the schema-specific query against the dataset stored in the database to generate a query result. The operations include providing, by the computing system, the query result as an output.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Generally, the present disclosure is directed to systems and methods that generate and/or apply query templates that are expressed in a generic schema-agnostic language. The query templates can be generated "from scratch" or can be automatically generated from existing queries, a process which may be referred to as "templatizing" the existing queries. As one example, generation of query templates can be performed through an iterative process that iteratively generates candidate templates over time to optimize a coverage over a set of existing queries. After generation of the schema-agnostic query templates, the systems and methods described herein can automatically translate/map the templatized queries into "concrete," schema-specific queries that can be evaluated over specific customer schemas/datasets. In this manner, a query template for a given semantic query (e.g., "return the names of all employees"), is required to be written only once as a query template. The proposed systems and methods can then translate the query template into any number of schema-specific queries that appropriately account for (e.g., enable evaluation against) any number of specific schemas that are provided as input. In another aspect, given a query template and a description of a specific schema, the proposed systems and methods can evaluate the feasibility of generating a schema-specific query from the query template for the specific schema. Thus, example aspects of the present disclosure are directed to generating and/or providing templated queries to users, evaluating feasibility of the templated queries on a user's schema, generating a schema-specific query from the templated queries (e.g., which can be parametrized), and executing the schema-specific query on the user's schema to generate a query result for the user.

More particularly, aspects of the present disclosure offer users the ability to evaluate a query irrespectively of the underlying schema that they are using. To do, the systems and methods of the present disclosure can generate and apply a query template. In some implementations, a query template can be a (query) specification that describes a generic request like "return the names of all employees".

As one example, a query template might look like:

Query Template: SELECT<name_column_list>, OPTIONAL(<age>)
FROM<employee_table_name>
OPTIONAL(WHERE<age>><value>)

This example query template is not tied to a particular schema (i.e., it is "schema-agnostic"). Given such a template, and with reference to the Background section, aspects of the present disclosure enable both Company A and Company B to evaluate the query template without caring about how the query template maps to their underlying schemas. Indeed, the proposed systems leverage a mechanism where given: (a) a query template (like the one above); and (b) the schema of the underlying data, the template is automatically translated into a concrete query that can run over the respective schemas. So, for the schema of Company A, the translation mechanism will translate the template above to query Q1, while for the schema of Company B, query Q2 will be generated. The above queries and query template are provided as simplified examples, more elaborate queries are possible.

In contrast with the automated generation and application of templates proposed herein, past work on query templatization was limited to providing simple run-time arguments to queries. For example, the extent of SQL templatization in the past has been limited to supporting value parameters, as follows:

Q3: SELECT name
FROM Employees
WHERE age >"?"

where the "?" in the WHERE clause can be dynamically replaced with a value (say, 25) provided by the user at run-time. However, key constructs of the query like the table and column names are always fixed. Further, all portions of the query are required and an absence of data for any of the portions cannot be handled.

To address these limitations, users often rely on query views as a substitute for true query templates. So, users write a query over a view only once (as would happen if a true templatized query mechanism existed), and this query is translated into a query over an underlying schema (say, for Company A or Company B) through a set of mappings. The obvious limitation with the query views approach is that these mappings must be known a priori and are often created manually as well. Furthermore, for the query view mechanism to work, it assumes that all the constructs in the view (tables and columns in the case of relational databases) are mapped to the underlying schema.

In contrast, the templated queries mechanism proposed herein considers portions of the template that are optional and might or might not be mapped when the template is translated. As an example, a template that returns the name and possibly the age (if present) of all employees might return a result either without an age column (for a company whose underlying schema does not store the ages of its employees) or with an age column (for a company that stores this information). Similarly, the query template might have an optional filter that selects only those employees, say, above 25 years old. The filter might be applied for the employees of Company A, if the company stores its employee's ages, but might not be applied for Company B when this information is unavailable. Such dynamic customizations of query templates are substantial advancements beyond the rudimentary capabilities of current mechanisms (including that of query views, which, as indicated, cannot handle optionality).

More particularly, a query generation and application platform can be executed by a computing system that includes one or more computing devices. The query generation and application platform can generate one or more query templates and/or apply the query templates to datasets with varying schemas.

In some implementations, the query templates can be drafted from scratch. As one example, a set of predefined query templates can be developed (e.g., by the developers of the platform itself) and offered as a package to users. As another example, a user can directly draft a query template by entering the query template into the computing system (e.g., via a graphical user interface). As another example, the user can modify an existing schema-specific query or existing query template to generate a new query template which can be saved for later use.

In other examples which are discussed in further detail below, the computing system can implement one or more algorithms to automatically generate new query templates. In one example, given a set of existing query templates (e.g., provided by the user), the computing system can automatically synthesize a query template that is the semantic equivalent (e.g., provides the same result set) of as large a portion of the set of existing query templates as possible.

According to an aspect of the present disclosure, a query template can leverage a taxonomy as a way to establish a common language that describes datasets that are brought into the platform by the user and also the query templates that the platform is attempting to instantiate over these datasets. Each taxonomy can include one or more taxonomy tags. Each taxonomy tag can be a schema-agnostic representation of a data group. For example, a taxonomy tag can relate to a semantic concept and the taxonomy tag can be a stand-in reference to any schema-specific data (e.g., columns) which also refer or relate to such semantic concept (e.g., using a schema-specific vocabulary). A taxonomy tag can be manually defined and/or a set of default taxonomy tags can be provided. Thus, the taxonomy can be flexible and can be bound to any different use case or semantic query type.

To provide an example, referring to the example query template and queries Q1 and Q2 provided above, the taxonomy tag "name_column_list" is a schema-agnostic representation of the semantic concept of employee names. This taxonomy tag can be mapped to the schema-specific vocabulary used by the respective schemas of datasets of Company A and Company B that refer to the same semantic concept. Specifically, for the semantic concept of employee names, the schema of Company A contains a column called 'name' in a table called 'Employees' while the schema of Company B contains two columns, called 'first_name' and 'last_name', in the table called 'Personnel'. Thus, the schema-agnostic taxonomy tag "name_column_list" can be mapped to these schema-specific vocabulary items.

As indicated above, in some instances the query templates can be manually created while in other instances the computing system can automatically generate the query templates from a set of one or more existing queries (e.g., that are respectively associated with and executable over one or more existing datasets). Thus, in one example, the computing system can receive a set of one or more existing schema-specific queries respectively associated with one or more existing datasets and can generate a query template based on the set of one or more existing schema-specific queries.

As one example, generating the query template based on the set of existing schema-specific queries can include iteratively generating a candidate query template based on the set of one or more existing schema-specific queries and applying the candidate query template to the one or more existing datasets respectively associated with the one or more existing schema-specific queries to obtain one or more candidate result sets. For example, executing the candidate query template against the existing datasets can include, for each existing dataset, generating a respective schema-specific query from the candidate query template and evaluating the respective schema-specific query over the existing dataset to obtain a respective candidate result set for the existing database.

At each iteration, the computing system can compare the one or more candidate result sets with one or more existing result sets generated by execution of the one or more schema-specific queries against the one or more existing datasets. For example, if a candidate result set generated for a particular dataset matches (e.g., identically) the existing result set generated by execution of a particular existing schema-specific query against the particular dataset, then the corresponding candidate query template can be indicated as having positive coverage for the particular existing schema-specific query. Stated differently, if application of a particular candidate query template to an existing dataset provides the same result as application of the corresponding existing schema-specific query, then the candidate query template can be said to have coverage of such existing schema-specific query.

The computing system can iteratively search for a candidate query template that provides maximum coverage with respect to the set of existing schema-specific queries. Various techniques can be performed at each iteration to generate the candidate query template(s) to be evaluated at such iteration. As one example, existing queries and/or associated datasets can be represented using trees and/or graphs. An automated process can analyze available trees and/or overlaps/overlays of trees between the candidate query templates and the existing queries. This analysis can reveal which portions of the queries are essential versus which are optional and can assist in understanding how changes to the candidate query template will change the semantics of the corresponding result set(s).

As another example, iterative search techniques such as evolutionary search can be performed to generate the candidate query templates. For example, a random mutation can be applied to the query template at each iteration and it can be assessed whether such random mutation increases or diminishes coverage. As yet another example, reinforcement learning techniques can be used to learn an agent model that generates candidate query templates. For example, an amount of coverage (or relative increase thereof) can be used to reward/train the agent model for its generation of candidate query templates. In one example, the agent model can be a recurrent neural network.

Thus, candidate query templates can be iteratively generated and evaluated until some stopping condition is met, with the objective of maximizing coverage over a set of existing queries. This process can be conceptually viewed as reverse engineering a set of existing queries (e.g., supplied by a user) to generate a query template (e.g., which can then be applied by the user to other different and/or new datasets). This process can provide significant savings of time and effort. For example, an organization such as a large corporation may have thousands of different datasets/databases. The organization can generate a few schema-specific queries which can then be used to generate (e.g., automatically) a query template which can be applied to a much larger number of datasets. Therefore, the amount of schema-specific queries that need to be manually generated can be greatly reduced, saving time and effort.

The query templates (e.g., automatically generated query templates) can be expressed according to many different database structural languages. One example language is the SQL language. Other example languages are graph-based languages such as SPARQL. Thus, in some examples, the dataset can include structured data (e.g. the data can be SQL data and the query language can be SQL). In other examples, the dataset can include semi-structured data (e.g. the data can be XML data and the query language can be XPATH). In other examples, the dataset can include graph data (e.g. RDF data) and the query language can be a graph-based language (e.g., SPARQL). Once query templates have been generated, imported, or otherwise included within the query generation and application platform, they can be applied against datasets (e.g., datasets uploaded, linked, or otherwise made accessible to the platform by the user). As one example, a dataset made accessible by a user can include a web analytics dataset generated by a web analytics service such as, for example, Google Analytics.

According to an aspect of the present disclosure, the query generation and application platform can translate a query template into any number of schema-specific queries that appropriately account for (e.g., enable evaluation against) any number of specific schemas that are provided as input.

As one example, for a certain pair of dataset and query template or taxonomy, the query generation and application platform can access a schema-taxonomy mapping associated with the dataset. The schema-taxonomy mapping can define a mapping between the one or more taxonomy tags included in the template or taxonomy and one or more components of the schema of the dataset. The schema-taxonomy mapping can be manually generated or can be automatically generated. Each mapping in the schema-taxonomy mapping can be one-to-one, one-to-many, or many-to-one.

As one example, characteristics of the schema components can be matched against expected characteristics associated with the taxonomy tag to generate the mapping between the components of the schema and the taxonomy tags. For example, an expected character length associated with a taxonomy tag can be used to map the taxonomy tag to components of a schema.

To provide an example, with some well-known exceptions, SKU's are typically alphanumeric strings that are between 6-8 characters long. Therefore, a schema component (e.g., column) that contains data entries that are consistently alphanumeric strings that are between 6-8 characters long can be inferred to map to a SKU taxonomy tag. To provide another example, UPC's are universally assigned and are 12 digits in the US and 13 digits in Europe. Therefore, schema components that match these characteristics can be mapped to a UPC taxonomy tag. Another pattern that can be leveraged is that SKU and UPC entries are typically unique and are typically not repeated in their respective columns.

More generally, patterns exhibited by the characteristics of data associated with different schema components can be leveraged to automatically determine the mapping between the one or more taxonomy tags and the schema components. In one example, a machine-learned model (e.g., neural network) can be trained to infer the mapping when given the schema and/or underlying dataset and the query template and/or taxonomy as an input. For example, the machine-learned model can be trained in a supervised fashion using existing mappings between taxonomy tags and schema components. As another example, in a reinforcement learning approach an agent can be trained to generate the mapping between the schema and the taxonomy tags. Specifically, the agent can be trained using a reward function that evaluates how well the mapping generated by the agent enables the query template to be applied to the dataset to obtain the same coverage as an existing query for the dataset.

Another yet further examples, the techniques described in International Application Number PCT/US19/60010, filed Nov. 6, 2019, for automatically determining mappings between two schemas can be adapted to instead automatically determine a mapping between a specific schema and a schema-agnostic query or taxonomy. International Application Number PCT/US19/60010 is hereby incorporated by reference in its entirety.

Having obtained the schema-taxonomy mapping between the dataset and the taxonomy or template, the query generation and application platform can modify the query template based on the schema-taxonomy mapping to generate a schema-specific query.

As one example, modifying the query template based on the schema-taxonomy mapping to generate the schema-specific query can include replacing each respective reference in the query template to one of the taxonomy tags with a replacement reference to the one or more components of the schema to which the taxonomy tag is mapped by the schema-taxonomy mapping. Stated differently, each taxonomy tag in the query template can be replaced with reference to the schema component(s) that were mapped to such taxonomy tag.

In some implementations, the query templates can be parameterized. In such implementations, modifying the query template based on the schema-taxonomy mapping to generate the schema-specific query can include identifying one or more user-specifiable parameters included in the query template; providing a user interface that enables a user to enter values for the one or more user-specifiable parameters; and constructing the schema-specific query with the values entered by the user via the user interface for the one or more user-specifiable parameters. Thus, as one example, a user can be requested to supply specific dates for a filter applied by the query.

In some implementations, one or more machine-learned models can be used to modify the query template based on the schema-taxonomy mapping to generate the schema-specific query. As one example, the machine-learned model can be a sequence-to-sequence model which can be trained to re-write the query template into the schema-specific query, for example taking the schema-taxonomy mapping (or an embedding thereof) as context. For example, this approach can be conceptually similar to the use of sequence-to-sequence models for machine translation.

The query generation and application platform can then execute the schema-specific query against the dataset stored in the database to generate a query result and provide the query result as an output. For example, the query result can be displayed to the user. In another example, the schema-specific query can be generated and applied, and the query result can be supplied to another application, device, or entity as a service (e.g., the request for query application was received via an application programming interface (API) and the query result is returned via the API).

According to another aspect of the present disclosure, given a query template and a description of a specific schema, the query generation and application platform can evaluate the feasibility of generating a schema-specific query from the query template for the specific schema. For example, when a user first introduces a dataset into the platform, the platform can automatically evaluate which query templates included in the platform are feasible to run against the new dataset and its associated schema. The platform can provide some visual indication of which query templates are feasible to execute against the dataset. For example, queries that are not feasible to apply can be "greyed-out" or otherwise rendered not selectable.

A number of different techniques can be performed to evaluate the feasibility of applying a query template to a dataset and its associated schema. As one example, evaluating the feasibility of generating a schema-specific query from the query template can include identifying one or more essential taxonomy tags and one or more optional taxonomy tags included in the query template and determining whether the schema-taxonomy mapping defines a mapping to at least one component of the schema for each of the one or more essential taxonomy tags. Stated differently, in some implementations, it may be feasible to generate a schema-specific query from a query template only when each taxonomy tag in the query template has at least one component of the schema mapped thereto. In some implementations, where none of the schema components map to a taxonomy tag included in the query template, the query can still be evaluated in principle, while returning a NULL value for all the values for the taxonomy tag. An alternative to these NULL values is for the logic to allow query templates to be triggered only when all the taxonomy tags are grounded to concrete relation elements.

Furthermore, note that it may be feasible to generate a schema-specific query from a query template even when there are not any schema components mapped to a taxonomy tag which is an optional taxonomy tag. This ability to disregard the absence of data for optional tags is a significant advance over existing schema mapping systems that require a one-to-one mapping for all elements of a query.

As another example technique to evaluate feasibility, the amount of data associated with a schema component implicated in the query template (e.g., a schema template that maps to a taxonomy tag included in the query template) can be compared to an average or total amount of data associated with other schema components and/or the dataset at large. This can ensure that the presence of data that is significantly incomplete does not give a false positive for the feasibility of applying a query template to a dataset. Thus, in some implementations, evaluating the feasibility of generating the schema-specific query from the query template can include determining, for at least one of the taxonomy tags, a number of non-null data entries included in the dataset associated with such taxonomy tag versus a total count of data entries included in the dataset.

Additional aspects of the present disclosure focus on the queries that have not been activated. For example, if the user notices that there is a query template that is very interesting, but that the query is not activated (feasible). In such a scenario, the platform can analyze the available dataset and can provide the user with an indication as to what types of data must be imported to activate this query. This setting creates a useful feedback loop where new data into the system activate classes of queries, while classes of unactivated queries guide the client as to what types of data must be imported next.

Thus, example aspects of the present disclosure are directed to generating and/or providing templated queries to users, evaluating feasibility of the templated queries on a user's schema, generating a schema-specific query from the templated queries (e.g., which can be parametrized), and executing the schema-specific query on the user's schema to generate a query result for the user.

The systems and methods of the present disclosure provide a number of technical effects and benefits. In particular, the proposed systems and methods do not simply map between two different existing schemas, but instead are flexible against genuine structural changes. As one example, the proposed systems and methods can indicate whether a given dataset has sufficient data to enable application of a query template (a concept referred to elsewhere herein as "feasibility"). As another example, the proposed systems and methods can enable and handle optional features within a query template. For example, applying optional portions of a query template (e.g., optional requests for data associated with taxonomy tags) can include determining whether a given dataset has sufficient data to provide a result for the optional portion of the query template.

With reference now to the Figures, example embodiments of the present disclosure will be discussed in further detail.

Example Devices and Systems

Figure 1A:
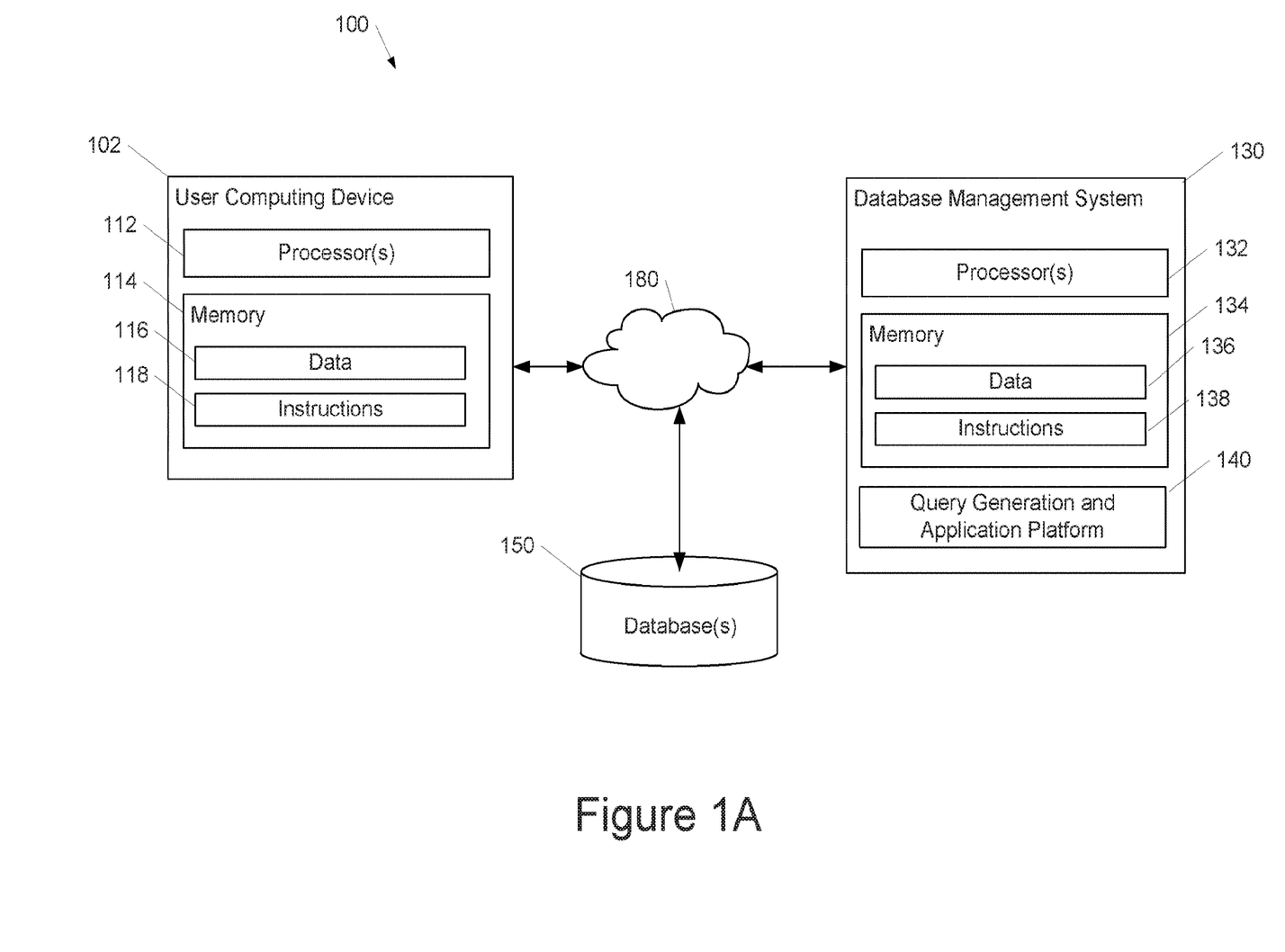
FIGS. 1A-B depict block diagrams of example computing systems according to example embodiments of the present disclosure.

FIG. 1A depicts a block diagram of an example computing system 100 according to example embodiments of the present disclosure. The computing system 100 includes a user computing device 102 and a database management system 130 in communication over a network 180 (e.g., according to a client-server relationship). The database management system 130 manages or otherwise has access to one or more databases 150. Communications among any of the device 102, system 130, and/or database(s) 150 can be formatted or structured according to one or more application programming interfaces (APIs).

The user computing device 102 can be any type of device, including a personal computing device and/or a client server device. Personal computing devices can include a laptop, a desktop, a smartphone, a tablet, an embedded computing device, a gaming console, etc.

The user computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The database management system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the database management system 130 to perform operations.

In some implementations, the database management system 130 includes or is otherwise implemented by one or more server computing devices. In instances in which the database management system 130 includes plural server computing devices, such server computing devices can operate according to sequential computing architectures, parallel computing architectures, or some combination thereof.

The database management system 130 can include and execute a query generation and application platform 140. The query generation and application platform 140 can provide core services of storing, processing, and securing data to/from the database(s) 150. In some implementations, the query generation and application platform 140 can include a query parser, a query optimizer, an execution engine, a metadata manager, an API handler, a query result returner, and/or other components.

According to an aspect of the present disclosure, the query generation and application platform 140 can generate and/or apply one or more query templates that are expressed in a generic schema-agnostic language. The query templates can be generated "from scratch" or can be automatically generated from existing queries, a process which may be referred to as "templatizing" the existing queries. As one example, the query generation and application platform 140 can generate query templates through an iterative process that iteratively generates candidate templates over time to optimize a coverage over a set of existing queries. After generation of the schema-agnostic query templates, the query generation and application platform 140 can automatically translate/map the templatized queries into "concrete," schema-specific queries that can be evaluated over specific customer schemas/datasets. In this manner, a query template for a given semantic query (e.g., "return the names of all employees"), is required to be written only once as a query template. Thus, the query generation and application platform 140 can translate the query template into any number of schema-specific queries that appropriately account for (e.g., enable evaluation against) any number of specific schemas that are provided as input. In another aspect, given a query template and a description of a specific schema, the query generation and application platform 140 can evaluate the feasibility of generating a schema-specific query from the query template for the specific schema. One example query generation and application platform 140 is described with reference to FIG. 2.

Referring still to FIG. 1, the database(s) 150 can store one or more datasets, which, for example, can include tables of data. Tables of data (or individual rows, columns, or entries thereof) can be related to each other. Specifically, each dataset stored in the database(s) 150 can be organized or structured according to a specific schema. The datasets can be associated with specific users and, in some implementations, a user must be logged into the query generation and application platform 140 to access their associated datasets.

The database(s) 150 can be one database or can be multiple, physically distributed databases. The database(s) 150 can be backed up by multiple storage devices such as, for example, storage disks.

The query generation and application platform 140 (or any sub-systems thereof) can include computer logic utilized to provide desired functionality. The query generation and application platform 140 (or any sub-systems thereof such as those shown in FIG. 2) can be implemented in hardware, firmware, and/or software controlling a general purpose processor. For example, in some implementations, the query generation and application platform 140 (or any sub-systems thereof) includes program files stored on a storage device, loaded into a memory and executed by one or more processors. In other implementations, the query generation and application platform 140 (or any sub-systems thereof) includes one or more sets of computer-executable instructions that are stored in a tangible computer-readable storage medium such as RAM hard disk or optical or magnetic media.

Figure 1B:
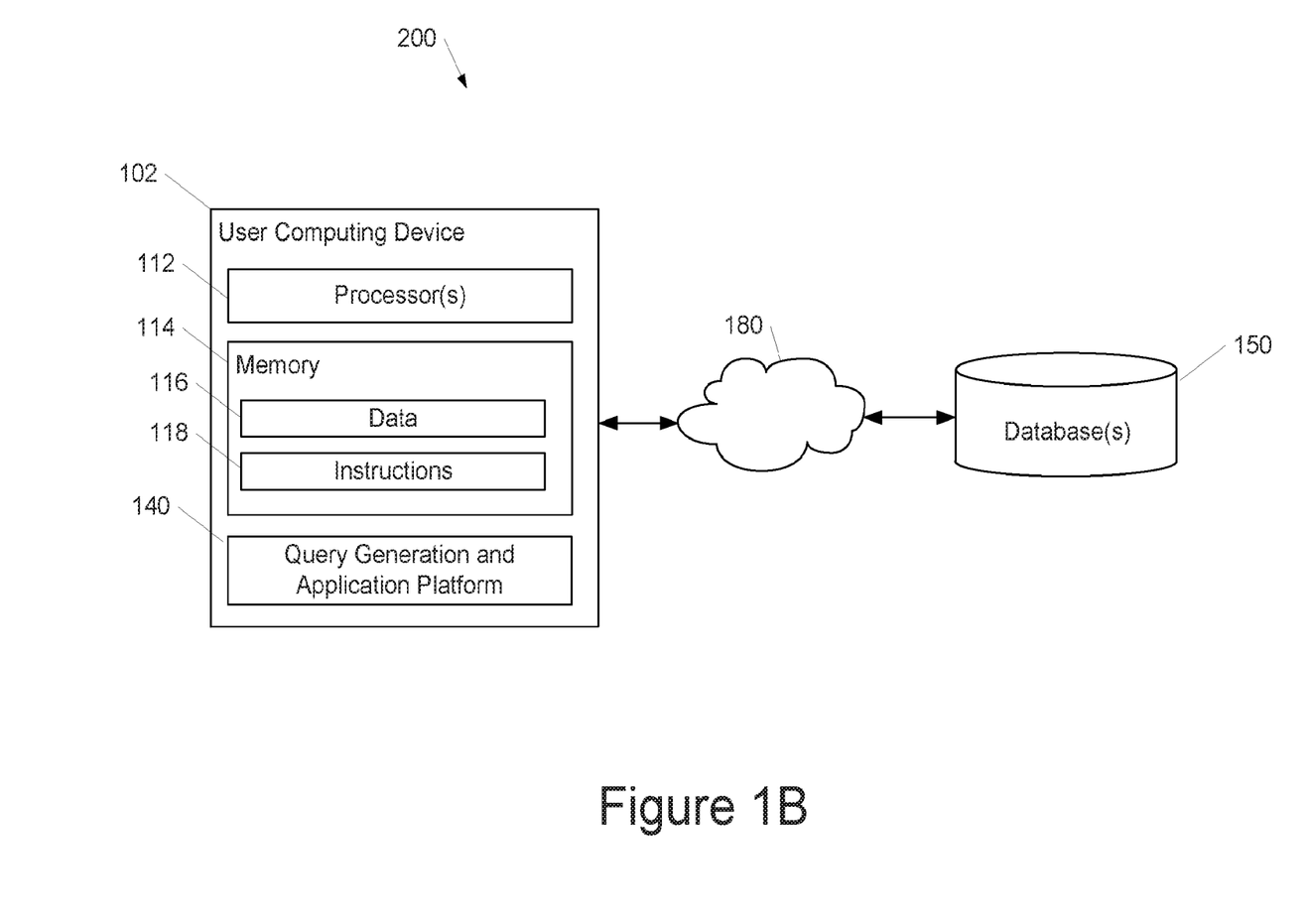

FIG. 1A shows one example computing system that can be used to implemented the query generation and application platform 140. Other computing systems can be used as well. As one example, FIG. 1B shows an alternative arrangement in which the query generation and application platform 140 is stored at and executed by the user computing device 102.

Figure 2:
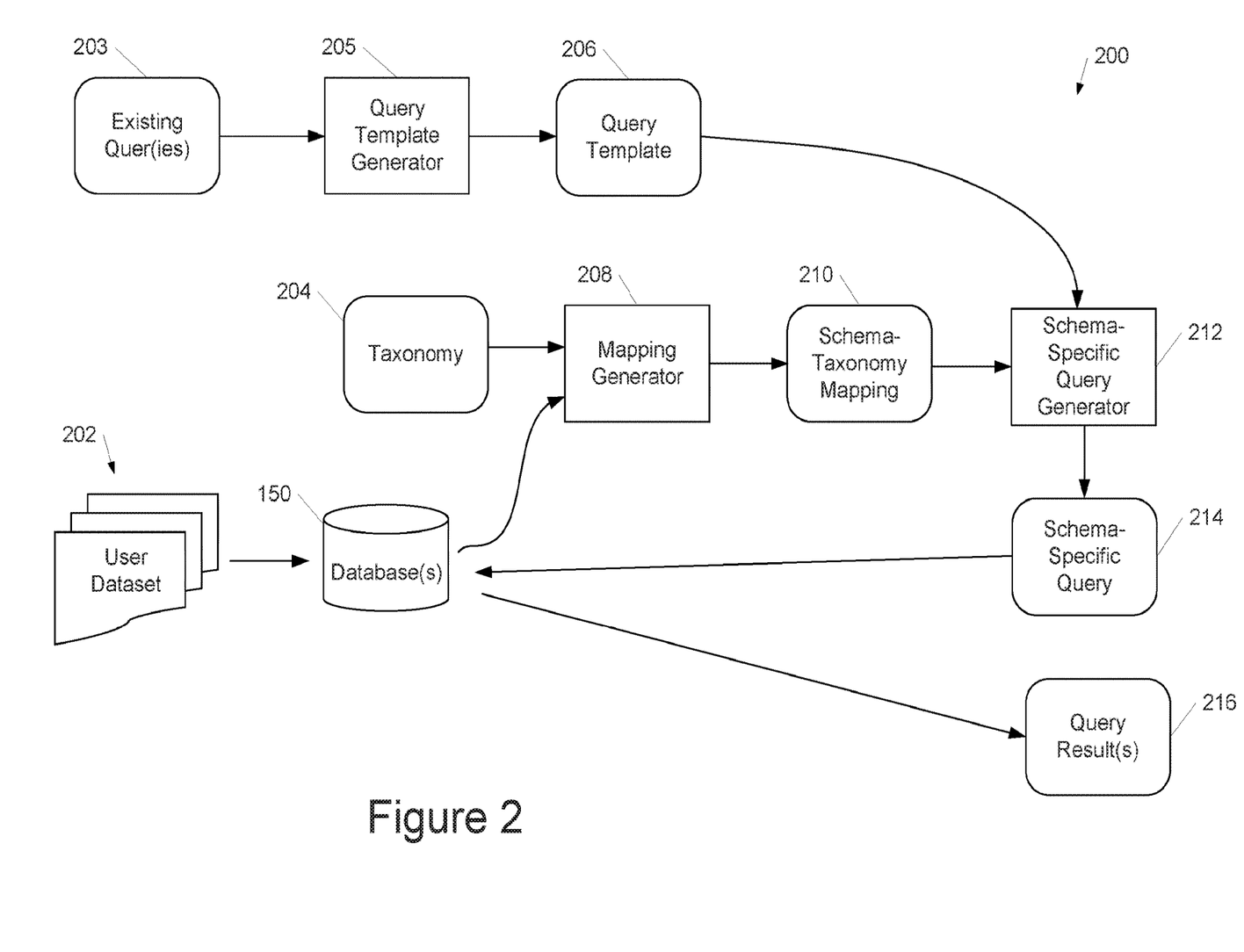
FIG. 2 depicts a block diagram of an example query generation and application platform according to example embodiments of the present disclosure.

FIG. 2 depicts a graphical diagram of an example query generation and application platform 200. The query generation and application platform 200 can be executed by a computing system that includes one or more computing devices (e.g., such as illustrated in FIGS. 1A and 1B). The query generation and application platform 200 can generate one or more query templates 206 and/or apply the query templates 206 to datasets with varying schemas (e.g., user dataset 202 stored in database 150).

In some implementations, the query templates 206 can be drafted from scratch. As one example, a set of predefined query templates 206 can be developed (e.g., by the developers of the platform itself) and offered as a package to users. As another example, a user can directly draft a query template 206 by entering the query template 206 into a graphical user interface of the platform 200. As another example, the user can modify an existing schema-specific query 203 or existing query template to generate a new query template which can be saved for later use.

In other examples, such as the example illustrated in FIG. 2, the platform 200 can implement a query template generator 205 to automatically generate new query templates 206. In one example, given a set of existing query templates 203 (e.g., provided by the user), the query template generator 205 can automatically synthesize a query template 206 that is the semantic equivalent (e.g., provides the same result set) of as large a portion of the set of existing query templates 203 as possible.

According to an aspect of the present disclosure, a query template 206 can leverage a taxonomy 204 as a way to establish a common language that describes datasets (e.g., 202) that are brought into the platform by the user and also the query templates 206 that the platform 200 is attempting to instantiate over these datasets. Each taxonomy 204 can include one or more taxonomy tags. Each taxonomy tag can be a schema-agnostic representation of a data group. For example, a taxonomy tag can relate to a semantic concept and the taxonomy tag can be a stand-in reference to any schema-specific data (e.g., columns) which also refer or relate to such semantic concept (e.g., using a schema-specific vocabulary). A taxonomy tag can be manually defined and/or a set of default taxonomy tags can be provided. Thus, the taxonomy 204 can be flexible and can be bound to any different use case or semantic query type.

One example query template 206 which retrieves profit by product is as follows:
Profit by Product:

---

SELECT taxonomy_tag.SKU, ( taxonomy_tag.Profit * Alias_Name.quantity )
AS profit

```
FROM (
    SELECT taxonomy_tag.SKU, taxonomy_tag.Profit
    FROM taxonomy_tag.Product
    JOIN (
        SELECT hits.item.productSku, SUM( hits.item.itemQuantity ) AS
quantity
        FROM [ 'GA Dataset Name' ]
        WHERE hits.item.productSku IS NOT NULL
        GROUP BY hits.item.productSku ) AS 'Alias_Name'
    ON taxonomy_tag.SKU = Alias_Name.hits.item.productSku );
    WHERE taxonomy_reldate >= @user_param1 AND taxonomy_reldate <=
@user_param2;
```

In the example query template 206 provided above, unknown columns or relations are represented by taxonomy tags. Furthermore, the last line of the query template includes two special indicators marked by @user_para1 and @user_param2. These indicators can be used to trigger a UI that asks the user to fill-in two values in order to scope the search of profitable products to those released between a pair of dates.

As indicated above, in some instances the query templates 206 can be manually created while in other instances the query template generator 205 can automatically generate the query templates 206 from a set of one or more existing queries 203 (e.g., that are respectively associated with and executable over one or more existing datasets). Thus, in one example, the platform 200 can receive a set of one or more existing schema-specific queries 203 respectively associated with one or more existing datasets and can generate a query template 206 based on the set of one or more existing schema-specific queries.

As one example, generating the query template 206 based on the set of existing schema-specific queries 203 can include iteratively generating, by the query template generator 205, a candidate query template based on the set of one or more existing schema-specific queries 203 and applying the candidate query template to the one or more existing datasets respectively associated with the one or more existing schema-specific queries 203 to obtain one or more candidate result sets. For example, executing the candidate query template against the existing datasets can include, for each existing dataset, generating a respective schema-specific query from the candidate query template and evaluating the respective schema-specific query over the existing dataset to obtain a respective candidate result set for the existing database.

At each iteration, the computing system can compare the one or more candidate result sets with one or more existing result sets generated by execution of the one or more schema-specific queries 203 against the one or more existing datasets. For example, if a candidate result set generated for a particular dataset matches (e.g., identically) the existing result set generated by execution of a particular existing schema-specific query 203 against the particular dataset, then the corresponding candidate query template can be indicated as having positive coverage for the particular existing schema-specific query 203. Stated differently, if application of a particular candidate query template to an existing dataset provides the same result as application of the corresponding existing schema-specific query 203, then the candidate query template can be said to have coverage of such existing schema-specific query.

The query template generator 205 can iteratively search for a candidate query template that provides maximum coverage with respect to the set of existing schema-specific queries 203. Various techniques can be performed at each iteration to generate the candidate query template(s) to be evaluated at such iteration. As one example, existing queries and/or associated datasets can be represented using trees and/or graphs. An automated process can analyze available trees and/or overlaps/overlays of trees between the candidate query templates and the existing queries. This analysis can reveal which portions of the queries are essential versus which are optional and can assist in understanding how changes to the candidate query template will change the semantics of the corresponding result set(s).

As another example, iterative search techniques such as evolutionary search can be performed to generate the candidate query templates. For example, a random mutation can be applied to the candidate query template at each iteration and it can be assessed whether such random mutation increases or diminishes coverage. As yet another example, reinforcement learning techniques can be used to learn an agent model that generates candidate query templates. For example, an amount of coverage (or relative increase thereof) can be used to reward/train the agent model for its generation of candidate query templates. In one example, the agent model can be a recurrent neural network.

Thus, candidate query templates can be iteratively generated and evaluated until some stopping condition is met, with the objective of maximizing coverage over a set of existing queries. This process can be conceptually viewed as reverse engineering a set of existing queries 203 (e.g., supplied by a user) to generate a query template 206 (e.g., which can then be applied by the user to other different and/or new datasets). This process can provide significant savings of time and effort. For example, an organization such as a large corporation may have thousands of different datasets/databases. The organization can generate a few schema-specific queries which can then be used to generate (e.g., automatically) a query template which can be applied to a much larger number of datasets. Therefore, the amount of schema-specific queries that need to be manually generated can be greatly reduced, saving time and effort.

The query templates 206 (e.g., automatically generated query templates) can be expressed according to many different database structural languages. One example language is the SQL language. Other example languages are graph-based languages such as SPARQL. Thus, in some examples, the dataset can include structured data (e.g. the data can be SQL data and the query language can be SQL). In other examples, the dataset can include semi-structured data (e.g. the data can be XML data and the query language can be XPATH). In other examples, the dataset can include graph data (e.g. RDF data) and the query language can be a graph-based language (e.g., SPARQL). Once query templates 206 have been generated, imported, or otherwise included within the query generation and application platform 200, they can be applied against datasets (e.g., datasets uploaded, linked, or otherwise made accessible to the platform by the user such as dataset 202). As one example, a dataset made accessible by a user can include a web analytics dataset generated by a web analytics service such as, for example, Google Analytics.

According to an aspect of the present disclosure, the query generation and application platform 200 can translate a query template 206 into any number of schema-specific queries 214 that appropriately account for (e.g., enable evaluation against) any number of specific schemas that are provided as input.

As one example, for a certain pair of dataset 202 and query template 206 or taxonomy 204, the query generation and application platform 200 can access a schema-taxonomy mapping 210 associated with the dataset 202. The schema-taxonomy mapping 210 can define a mapping between the one or more taxonomy tags included in the query template 206 or taxonomy 204 and one or more components of the schema of the dataset 202. The schema-taxonomy mapping 210 can be manually generated or can be automatically generated (FIG. 2 shows automatic generation of the schema-taxonomy mapping 210 by a schema-taxonomy mapping generator 208).

As one example, characteristics of the schema components of the schema of the dataset 202 can be matched against expected characteristics associated with the taxonomy tag included in the taxonomy 204 to generate the mapping included in the schema-taxonomy mapping 210 between the components of the schema and the taxonomy tags. For example, an expected character length associated with a taxonomy tag can be used to map the taxonomy tag to components of a schema.

To provide an example, with some well-known exceptions, SKU's are typically alphanumeric strings that are between 6-8 characters long. Therefore, a schema component (e.g., column) that contains data entries that are consistently alphanumeric strings that are between 6-8 characters long can be inferred to map to a SKU taxonomy tag. To provide another example, UPC's are universally assigned and are 12 digits in the US and 13 digits in Europe. Therefore, schema components that match these characteristics can be mapped to a UPC taxonomy tag. Another pattern that can be leveraged is that SKU and UPC entries are typically unique and are typically not repeated in their respective columns.

More generally, patterns exhibited by the characteristics of data associated with different schema components can be leveraged to automatically determine the mapping in the schema-taxonomy mapping 210 between the one or more taxonomy tags of the taxonomy 204 or query template 206 and the schema components of the schema of the dataset 202. In one example, a machine-learned model (e.g., neural network) can be trained to infer the mapping when given the schema and/or underlying dataset and the query template 206 and/or taxonomy 204 as an input. For example, the machine-learned model can be trained in a supervised fashion using existing mappings between taxonomy tags and schema components. As another example, in a reinforcement learning approach an agent can be trained to generate the mapping between the schema and the taxonomy tags. Specifically, the agent can be trained using a reward function that evaluates how well the mapping generated by the agent enables the query template to be applied to the dataset to obtain the same coverage as an existing query for the dataset.

Another yet further examples, the techniques described in International Application Number PCT/US19/60010, filed Nov. 6, 2019, for automatically determining mappings between two schemas can be adapted to instead automatically determine a mapping between a specific schema and a schema-agnostic query or taxonomy. International Application Number PCT/US19/60010 is hereby incorporated by reference in its entirety.

As one example, an example imported data table may be as follows:

| Product | Product Name | Release Date | Price | Profit |
|---------|--------------|--------------|-------|--------|
| GXP4100 | Widget 1 | Aug. 23, 2016 | $300 | $10 |
| GVE2300 | Widget Max | Aug. 23, 2016 | $450 | $20 |
| TGB4245 | Super Widget | Aug. 15, 2017 | $700 | $30 |
| Pix-NEW60 | Widget Camera | Aug. 15, 2017 | $850 | $40 |

To continue the example, one example schema-taxonomy mapping 210 is as follows:

```
ProductProfile
ProductProfile {
    rel_name: "ClientDB.Product":
    rel_tag: "Product";
    cols {
        col_name: "Product";
        col_tag: "SKU";
    }
    cols {
        col_name: "Profit";
        col_tag: "profit";
    }
}
```

As another related example, an example template taxonomy profile is as follows:

```
ProfitByProductProfile
ProfitByProductProfile {
    rel_tag: "Product":
    col_tags: "SKU";
    col_tags: "Profit";
}
```

In this example, the set of taxonomy tags in the profile, "Profile" and "SKU", in the template are contained in those of the profile and therefore the template can be activated. For example, before the actual activation, for each col name associated with the template, a query is issued to check whether the column is actually populated with data. Since the optional check query is missing from the profile, then this means that the check queries for both columns are trivial and they just need to check for the presence of non-NULL values.

Even when all the taxonomy tags associated with a query template can be grounded to schema-taxonomy mapping, it might be the case that the imported relation actually provides no data for the imported column. For example, assume that in the an imported dataset the user has chosen to hide a certain data column (e.g., all the values in a "Profit" column are NULL). To address such issues, simple queries can be issued to determine whether certain important columns in the imported data are properly populated. For example the following query counts the tuples with populated profit values whose result can be compared with the number of tuples in the whole relation.

SELECT count(*)
FROM Product
WHERE profit IS NOT NULL;

Another consideration is that beyond the templated (taxonomy-annotated) parts of a query, to activate a query template it may also be necessary to check whether the data corresponding to the non-templated parts of a query are available in the corresponding database(s). For example, a check can be performed to determine whether the user's dataset hs indeed been imported into the database(s) accessible to the platform. This last check can be performed even for trivial queries (e.g., queries that contain no taxonomy tags but only rely on predetermined and well-known relations). For such queries, it is still useful to determine the points in time that a user imports all the necessary data into the platform to activate the queries.

Referring still to FIG. 2, having obtained the schema-taxonomy mapping 210 between the dataset 202 and the taxonomy 204, a schema-specific query generator 212 can modify the query template 206 based on the schema-taxonomy mapping 210 to generate a schema-specific query 214.

As one example, modifying the query template 206 based on the schema-taxonomy mapping 210 to generate the schema-specific query 214 can include replacing each respective reference in the query template 206 to one of the taxonomy tags with a replacement reference to the one or more components of the schema to which the taxonomy tag is mapped by the schema-taxonomy mapping 210. Stated differently, each taxonomy tag in the query template 206 can be replaced with reference to the schema component(s) that were mapped to such taxonomy tag.

For example, this replacement step can be performed by parsing the AST of the template (for example, using the Google SQL parser API) and replacing each reference to a tag with the corresponding relation and column mentioned in the associated TemplateTaxonomyProfile. Thus, in some implementations, the schema-specific query generator 212 can use both a schema-taxonomy mapping that relates the user dataset 202 to the taxonomy 204 and also a template taxonomy profile that relates the query template 206 to the taxonomy 204.

In some implementations, the query templates 206 can be parameterized. In such implementations, modifying the query template 206 based on the schema-taxonomy mapping 210 to generate the schema-specific query 214 can include identifying one or more user-specifiable parameters included in the query template 206; providing a user interface that enables a user to enter values for the one or more user-specifiable parameters; and constructing the schema-specific query 214 with the values entered by the user via the user interface for the one or more user-specifiable parameters. Thus, as one example, a user can be requested to supply specific dates for a filter applied by the query.

In some implementations, one or more machine-learned models can be used to modify the query template 206 based on the schema-taxonomy mapping 210 to generate the schema-specific query 214. As one example, the machine-learned model can be a sequence-to-sequence model which can be trained to re-write the query template 206 into the schema-specific query 214, for example taking the schema-taxonomy mapping 210 (or an embedding thereof) as context. For example, this approach can be conceptually similar to the use of sequence-to-sequence models for machine translation.

The query generation and application platform 200 can then execute the schema-specific query 214 against the dataset 202 stored in the database 150 to generate a query result 216. The query result 216 can be provided as an output. For example, the query result 216 can be displayed to the user. In another example, the schema-specific query 214 can be generated and applied, and the query result 216 can be supplied to another application, device, or entity as a service (e.g., the request for query application was received via an application programming interface (API) and the query result 216 is returned via the API).

Example Methods

Figure 3:
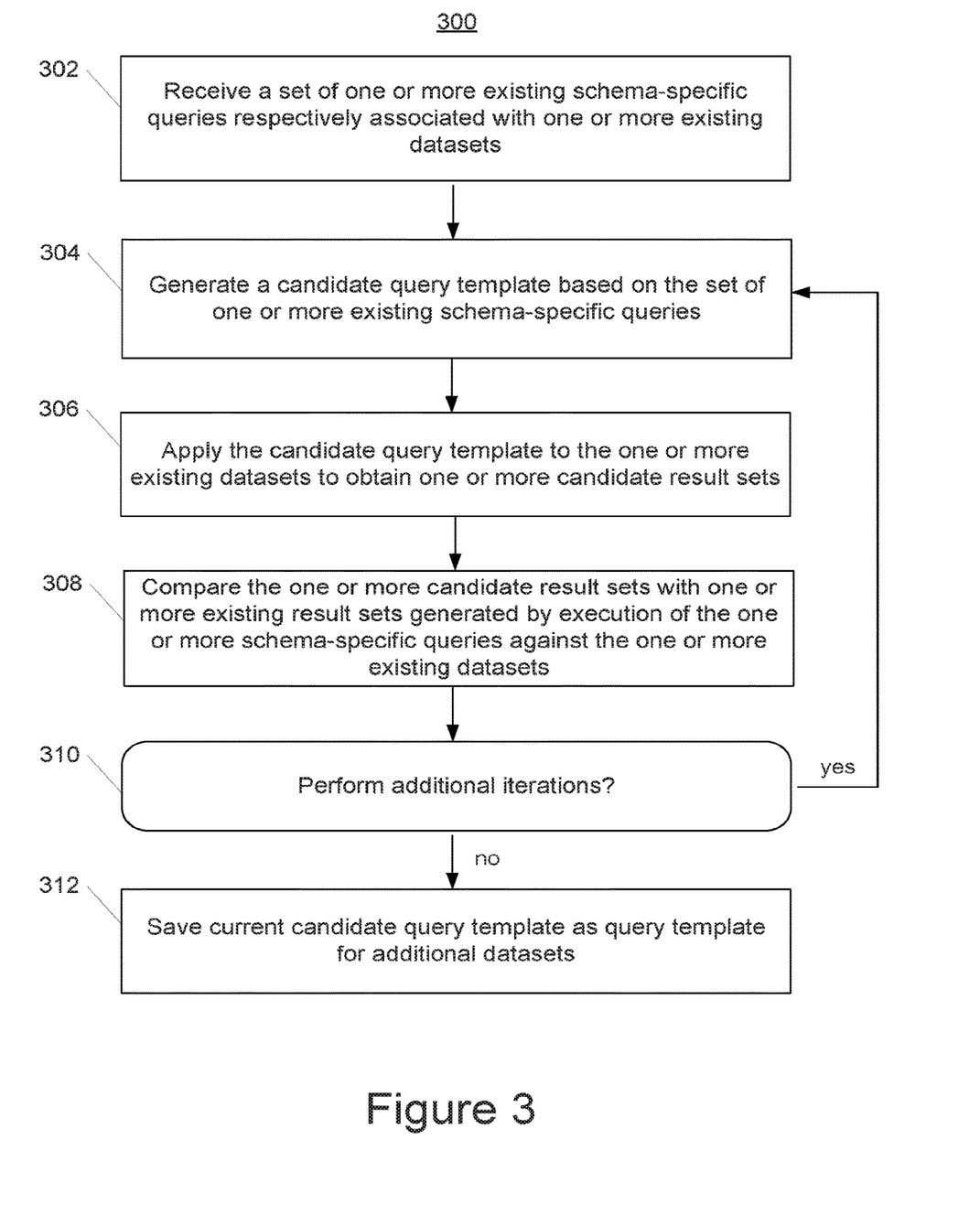
FIG. 3 depicts a flow chart of an example method to generate a query template according to example embodiments of the present disclosure.

FIG. 3 depicts a flow chart of an example method 300 to generate a query template according to example embodiments of the present disclosure.

At 302, a computing system can receive a set of one or more existing schema-specific queries respectively associated with one or more existing datasets. In particular, each existing dataset can be structured according to a specific schema and each schema-specific query can be written to account for such specific schema.

At 304, the computing system can generate a candidate query template based on the set of one or more existing schema-specific queries. For example, the candidate query template can be randomly initialized or an existing query template for a related task can be used as a starting place for the candidate query template.

At 306, the computing system can apply the candidate query template to the one or more existing datasets to obtain one or more candidate result sets. For example, application of the candidate query template to the one or more existing datasets can include performing, for each existing dataset, the method 400 of FIG. 4.

Referring still to FIG. 3, at 308, the computing system can compare the one or more candidate result sets with one or more existing result sets generated by execution of the one or more schema-specific queries against the one or more existing datasets. For example, the computing system can evaluate a coverage of the candidate query template relative to the set of existing schema-specific queries.

At 310, the computing system can determine whether additional iterations should be performed. For example, iterations can be performed until one or more stopping criteria are met. The stopping criteria can be any number of different criteria including, as examples, a loop counter reaching a predefined maximum, an iteration over iteration change in template adjustments falling below a threshold, an iteration over iteration change in a coverage amount falling below a threshold, a gradient of the loss function being below a threshold value, and/or various other criteria.

If it is determined at 310 that additional iterations should be performed, then method 300 can return to 304 and generate another candidate query template (e.g., by mutating or otherwise modifying the previous candidate query template).

However, if it is determined at 310 that no additional iterations should be performed then method 300 can proceed to 312. At 312, the computing system can save the current candidate query template as a query template which can be later used (e.g., applied to additional datasets at a later time).

Figure 4:
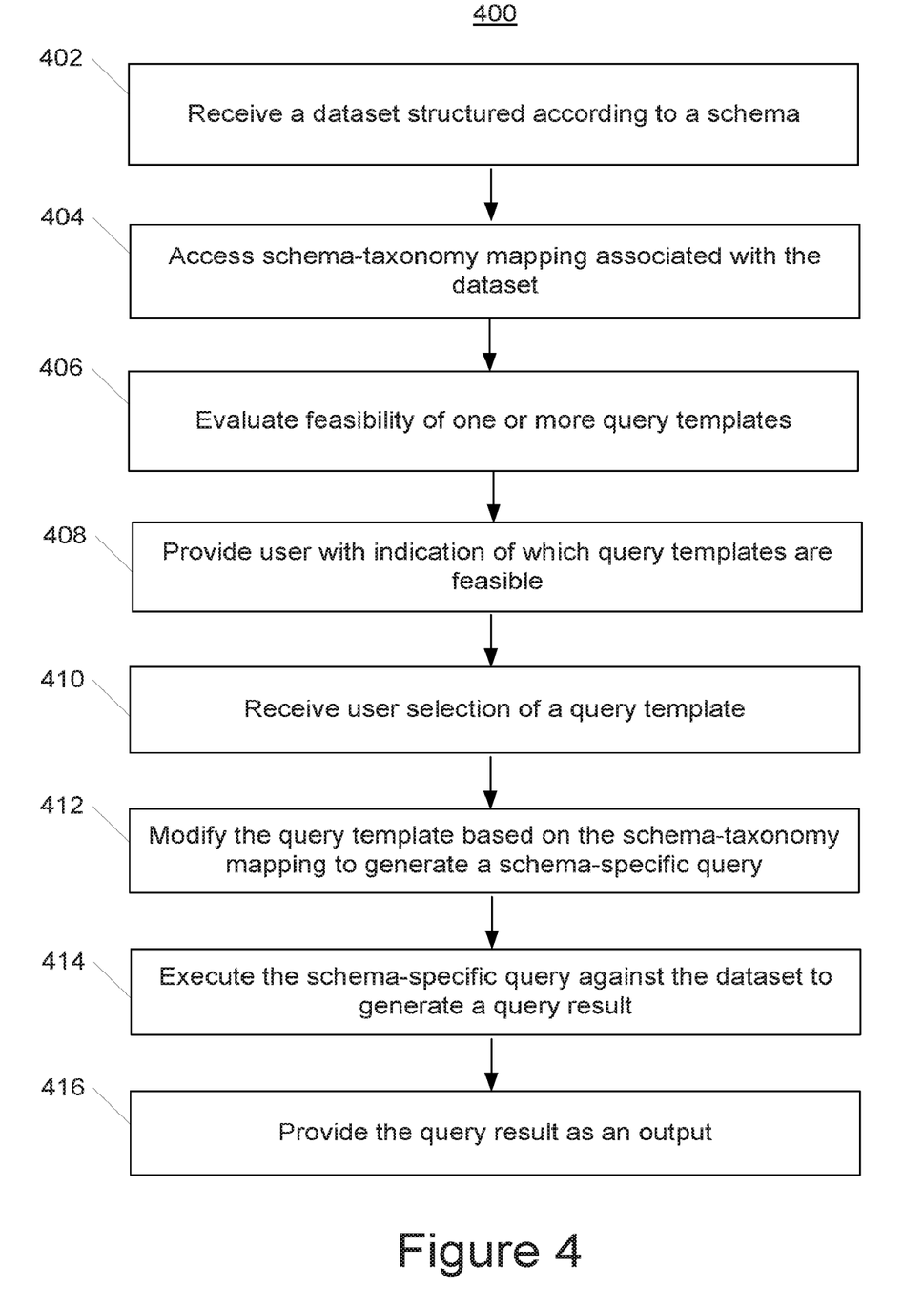
FIG. 4 depicts a flow chart of an example method to apply a query template to a dataset according to example embodiments of the present disclosure.

FIG. 4 depicts a flow chart of an example method 400 to apply a query template to a dataset according to example embodiments of the present disclosure.

At 402, a computing system can receive a dataset structured according to a schema. For example, the dataset can be uploaded, linked, or otherwise made accessible by a user.

At 404, the computing system can access a schema-taxonomy mapping associated with the dataset. For example, the schema-taxonomy mapping can be manually generated or automatically generated. The schema-taxonomy mapping can map each taxonomy tag in a taxonomy and/or query template to components of the schema of the dataset.

At 406, the computing system can evaluate a feasibility of applying one or more query templates to the dataset. At 408, the computing system can provide the user with an indication (e.g., in a user interface) of which query templates are feasible.

At 410, the computing system can receive a user selection of one of the query templates. At 412, the computing system can modify the query template based o the schema-taxonomy mapping to generate a schema-specific query.

At 414, the computing system can execute the schema-specific query against the dataset to generate a query result. At 416, the computing system can provide the query result as an output (e.g., display the result to the user or provide the result to another system (e.g., via an API)).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although certain figures respectively depict steps performed in a particular order for purposes of illustration and discussion, the methods of the present disclosure are not limited to the particularly illustrated order or arrangement. The various steps of the methods described herein can be omitted, rearranged, combined, and/or adapted in various ways without deviating from the scope of the present disclosure.

What is claimed is:

1. A computer-implemented method for application of schema-agnostic query templates to datasets, the method comprising:
   obtaining, by a computing system comprising one or more computing devices, a query template that includes one or more references to one or more taxonomy tags, each of the one or more taxonomy tags being a schema-agnostic representation of a data group;
   accessing, by the computing system, a schema-taxonomy mapping associated with a dataset that is stored in a database and structured according to a schema, wherein the schema-taxonomy mapping defines a mapping between the one or more taxonomy tags and one or more components of the schema of the dataset;
   modifying, by the computing system, the query template based on the schema-taxonomy mapping to generate a schema-specific query;
   executing, by the computing system, the schema-specific query against the dataset stored in the database to generate a query result; and
   providing, by the computing system, the query result as an output.

2. The computer-implemented method of claim 1, wherein obtaining, by the computing system, the query template comprises:
   receiving, by the computing system, a set of one or more existing schema-specific queries respectively associated with one or more existing datasets; and
   automatically generating, by the computing system, the query template based on the set of one or more existing schema-specific queries.

3. The computer-implemented method of claim 2, wherein automatically generating, by the computing system, the query template based on the set of one or more existing schema-specific queries comprises:
   for each of a plurality of iterations:
      generating, by the computing system, a candidate query template based on the set of one or more existing schema-specific queries;
      applying, by the computing system, the candidate query template to the one or more existing datasets respectively associated with the one or more existing schema-specific queries to obtain one or more candidate result sets; and
      comparing, by the computing system, the one or more candidate result sets with one or more existing result sets generated by execution of the one or more schema-specific queries against the one or more existing datasets.

4. The computer-implemented method of claim 2, wherein receiving, by the computing system, the set of one or more existing schema-specific queries respectively associated with the one or more existing datasets comprises receiving, by the computing system from a user of the computing system, a user input that identifies the set of one or more existing schema-specific queries and requests automatic generation of the query template.

5. The computer-implemented method of claim 1, wherein the query template comprises at least one portion that is essential and at least one portion that is optional.

6. The computer-implemented method of claim 1, further comprising, prior to modifying, by the computing system, the query template based on the schema-taxonomy mapping to generate the schema-specific query:
   evaluating, by the computing system and based at least in part on the schema-taxonomy mapping, a feasibility of generating the schema-specific query from the query template.

7. The computer-implemented method of claim 6, wherein evaluating, by the computing system and based at least in part on the schema-taxonomy mapping, the feasibility of generating the schema-specific query from the query template comprises:

identifying, by the computing system, one or more essential taxonomy tags and one or more optional taxonomy tags included in the query template; and determining, by the computing system, whether the schema-taxonomy mapping defines a mapping to at least one component of the schema for each of the one or more essential taxonomy tags.

8. The computer-implemented method of claim 6, wherein evaluating, by the computing system and based at least in part on the schema-taxonomy mapping, the feasibility of generating the schema-specific query from the query template comprises:

determining, by the computing system and for at least one of the taxonomy tags, a number of non-null data entries included in the dataset associated with such taxonomy tag versus a total count of data entries included in the dataset.

9. The computer-implemented method of claim 1, wherein:

obtaining, by the computing system, the query template comprises obtaining, by the computing system, a plurality of different query templates; and the method further comprises:

evaluating, by the computing system and based at least in part on the schema-taxonomy mapping, a feasibility of generating a respective schema-specific query from each of the plurality of query templates; and providing, by the computing system, an indication to a user of the computing system regarding for which of the plurality of query templates generation of the respective schema-specific query has been evaluated to be feasible.

10. The computer-implemented method of claim 9, further comprising:

receiving, by the computing system, a user input that selects one of the plurality of query templates for which generation of the respective schema-specific query has been evaluated to be feasible;

wherein said modifying, by the computing system, the query template, executing, by the computing system, the schema-specific query against the dataset, and providing, by the computing system, the query result as an output are performed in response to the user input that selects the one of the plurality of query templates.

11. The computer-implemented method of claim 1, wherein modifying, by the computing system, the query template based on the schema-taxonomy mapping to generate the schema-specific query comprises replacing, by the computing system, each respective reference in the query template to one of the taxonomy tags with a replacement reference to the one or more components of the schema to which the taxonomy tag is mapped by the schema-taxonomy mapping.

12. The computer-implemented method of claim 1, wherein modifying, by the computing system, the query template based on the schema-taxonomy mapping to generate the schema-specific query comprises:

identifying, by the computing system, one or more user-specifiable parameters included in the query template;

providing, by the computing system, a user interface that enables a user to enter values for the one or more user-specifiable parameters; and constructing, by the computing system, the schema-specific query with the values entered by the user via the user interface for the one or more user-specifiable parameters.

13. The computer-implemented method of claim 1, wherein modifying, by the computing system, the query template based on the schema-taxonomy mapping to generate the schema-specific query comprises:

processing, by the computing system, the query template and the schema-taxonomy mapping using a machine-learned model to generate the schema-specific query as an output of the machine-learned model.

14. The computer-implemented method of claim 1, wherein the dataset stored in the database comprises a SQL dataset stored in a relational database, and wherein the schema-specific query comprises an SQL query.

15. The computer-implemented method of claim 1, wherein the dataset stored in the database comprises semi-structured data or graph data.

16. A computing system that leverages schema-agnostic query templates, the computing system comprising:

a database that stores a dataset;

one or more processors; and one or more non-transitory computer-readable media that collectively store instructions that, when executed by the one or more processors, cause the computing system to perform operations, the operations comprising:

obtaining, by the computing system, a query template that includes one or more references to one or more taxonomy tags, each of the one or more taxonomy tags being a schema-agnostic representation of a data group;

accessing, by the computing system, a schema-taxonomy mapping associated with the dataset and structured according to a schema, wherein the schema-taxonomy mapping defines a mapping between the one or more taxonomy tags and one or more components of the schema of the dataset;

modifying, by the computing system, the query template based on the schema-taxonomy mapping to generate a schema-specific query;

executing, by the computing system, the schema-specific query against the dataset stored in the database to generate a query result; and providing, by the computing system, the query result as an output.

17. The computing system of claim 16, wherein obtaining, by the computing system, the query template comprises:

receiving, by the computing system, a set of one or more existing schema-specific queries respectively associated with one or more existing datasets; and automatically generating, by the computing system, the query template based on the set of one or more existing schema-specific queries.

18. The computing system of claim 17, wherein automatically generating, by the computing system, the query template based on the set of one or more existing schema-specific queries comprises:

for each of a plurality of iterations:

generating, by the computing system, a candidate query template based on the set of one or more existing schema-specific queries;

executing, by the computing system, the candidate query template against the one or more existing datasets respectively associated with the one or more existing schema-specific queries to obtain one or more candidate result sets; and comparing, by the computing system, the one or more candidate result sets with one or more existing result sets generated by execution of the one or more schema-specific queries against the one or more existing datasets.

19. The computing system of claim 16, wherein the query template comprises at least one portion that is essential and at least one portion that is optional.

20. A computing system that leverages schema-agnostic query templates, the computing system comprising: a database that stores a dataset; one or more processors; and one or more non-transitory computer-readable media that collectively store instructions that, when executed by the one or more processors, cause the computing system to perform operations, the operations comprising:

obtaining, by the computing system, a query template that includes one or more references to one or more taxonomy tags, each of the one or more taxonomy tags being a schema-agnostic representation of a data group;

accessing, by the computing system, a schema-taxonomy mapping associated with a dataset that is stored in a database and structured according to a schema, wherein the schema-taxonomy mapping defines a mapping between the one or more taxonomy tags and one or more components of the schema of the dataset;

modifying, by the computing system, the query template based on the schema-taxonomy mapping to generate a schema-specific query;

executing, by the computing system, the schema-specific query against the dataset stored in the database to generate a query result; and providing, by the computing system, the query result as an output.

* * * * *